US012253366B2

(12) United States Patent
Suzuki et al.

(10) Patent No.: US 12,253,366 B2
(45) Date of Patent: Mar. 18, 2025

(54) INFORMATION PROCESSING METHOD, INFORMATION PROCESSING SYSTEM, INFORMATION PROCESSING DEVICE, AND INFORMATION TERMINAL

(71) Applicant: Nissan Motor Co., Ltd., Yokohama (JP)

(72) Inventors: Kenta Suzuki, Kanagawa (JP); Kazuhiro Suzuki, Kanagawa (JP); Toshiharu Nakajima, Kanagawa (JP); Yasunori Maruyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/788,780

(22) PCT Filed: Dec. 15, 2020

(86) PCT No.: PCT/JP2020/046749
§ 371 (c)(1),
(2) Date: Jun. 24, 2022

(87) PCT Pub. No.: WO2021/131903
PCT Pub. Date: Jul. 1, 2021

(65) Prior Publication Data
US 2023/0046133 A1 Feb. 16, 2023

(30) Foreign Application Priority Data
Dec. 27, 2019 (JP) .................. 2019-238096

(51) Int. Cl.
G01C 21/00 (2006.01)
B60L 58/12 (2019.01)
(Continued)

(52) U.S. Cl.
CPC .......... *G01C 21/3415* (2013.01); *B60L 58/12* (2019.02); *G01C 21/3469* (2013.01); *G01C 21/3605* (2013.01)

(58) Field of Classification Search
CPC ............ G01C 21/3415; G01C 21/3469; G01C 21/3605; G01C 21/343; B60L 58/12; B60L 2250/14
See application file for complete search history.

(56) References Cited

U.S. PATENT DOCUMENTS

2008/0319596 A1* 12/2008 Yamada .................. B60L 50/61
903/930
2009/0071178 A1* 3/2009 Major ..................... B60L 58/27
62/239
(Continued)

FOREIGN PATENT DOCUMENTS

CN 108974008 A 12/2018
CN 110296712 A 10/2019
(Continued)

OTHER PUBLICATIONS

Machine Translation JP 2003106857 (year: 2003).*
(Continued)

Primary Examiner — Anne Marie Antonucci
Assistant Examiner — Jordan T Smith
(74) Attorney, Agent, or Firm — Global IP Counselors, LLP

(57) ABSTRACT

An information processing method, an information processing system, an information processing device, and an information terminal of the present invention, accepts a destination for the vehicle, then searches for the travel route to the destination and sets as a first travel route, and sets a travel start time to start traveling on the first travel route. Then, vehicle information is acquired for the vehicle in advance of the travel start time by a prescribed time after the setting of
(Continued)

the first travel route; and a travel route to the destination is searched again and a second travel route is set based on the vehicle information.

9 Claims, 3 Drawing Sheets

(51) Int. Cl.
*G01C 21/34* (2006.01)
*G01C 21/36* (2006.01)

(56) References Cited

U.S. PATENT DOCUMENTS

| | | | | |
|---|---|---|---|---|
| 2011/0301841 | A1* | 12/2011 | Schuurbiers | G01C 21/362 |
| | | | | 701/465 |
| 2013/0274972 | A1* | 10/2013 | Kusumi | B60W 50/085 |
| | | | | 701/22 |
| 2017/0067746 | A1* | 3/2017 | Lei | G01C 21/3469 |
| 2018/0164105 | A1* | 6/2018 | Park | G01C 21/3617 |
| 2018/0297483 | A1* | 10/2018 | Pevear | G01C 21/3691 |
| 2019/0232944 | A1* | 8/2019 | Kai | B60W 10/06 |
| 2019/0326652 | A1* | 10/2019 | Ogaki | H01M 10/6563 |
| 2019/0383628 | A1* | 12/2019 | Quint | G01C 21/3492 |

FOREIGN PATENT DOCUMENTS

| | | | |
|---|---|---|---|
| JP | 2003-106857 | A | 4/2003 |
| JP | 4048963 | B2 * | 2/2008 |
| JP | 2011-38845 | A | 2/2011 |
| JP | 2015-161604 | A | 9/2015 |
| JP | 2019-145115 | A | 8/2019 |
| JP | 2019-167097 | A | 10/2019 |
| JP | 2019-191200 | A | 10/2019 |

OTHER PUBLICATIONS

Machine translation of JP-4048963-B2 (Year: 2008).*
Chinese Office Action of Jul. 18, 2024 of corresponding Chinese Patent Application No. 202080089238.X.

* cited by examiner

INFORMATION PROCESSING METHOD, INFORMATION PROCESSING SYSTEM, INFORMATION PROCESSING DEVICE, AND INFORMATION TERMINAL

CROSS-REFERENCE TO RELATED APPLICATIONS

This application is a U.S. national stage application of International Application No. PCT/JP2020/046749, filed on Dec. 15, 2020. The present application claims priority based on Japanese Patent Application No. 2019-238096, filed on Dec. 27, 2019, and the entire contents thereof are incorporated herein by reference.

BACKGROUND

Technical Field

The present invention relates to an information processing method, an information processing system, an information processing device, and an information terminal.

Background Information

Japanese Laid-Open Patent Application No. 2015-161604 (Patent Document 1) discloses a feature relating to a navigation device that provides an optimal travel route that accounts for stopping at a charging facility so as to not run out of power when traveling in an electric automobile.

SUMMARY

However, according to the feature disclosed in Patent Document 1, a travel route accounting for passing through a charging facility is calculated at a timing at which a user of the electric automobile inputs a waypoint and a destination to the navigation device. Therefore, there is a risk that it will not be possible to start travel based on a travel route that reflects the most recent status of a vehicle even if the status changes after the travel route has been calculated.

The present invention has been designed in view of this problem, it being an object thereof to provide an information processing method, an information processing system, an information processing device, and an information terminal with which it is possible to start travel based on a travel route that reflects the most recent status of a vehicle even if the status changes after the travel route has been calculated.

In order to achieve the abovementioned object, in an information processing method, an information processing system, an information processing device, and an information terminal according to one aspect of the present invention: a destination for a vehicle is accepted from a user, a travel route to the destination is searched for and set as a first travel route, and after the first travel route has been set and before the vehicle starts traveling on the first travel route, a travel route to the destination is again searched for and set as a second travel route based on acquired vehicle information about the vehicle.

According to the present invention, it is possible to start travel based on a travel route that reflects the most recent status of a vehicle even if the status changes after the travel route has been calculated.

BRIEF DESCRIPTION OF THE DRAWINGS

Referring now to the attached drawings which form a part of this original disclosure.

DETAILED DESCRIPTION OF EMBODIMENTS

Embodiments of the present invention are described in detail below with reference to the accompanying drawings. Redundant descriptions in which the same reference symbols are associated with the same elements are omitted.

Figure 1:
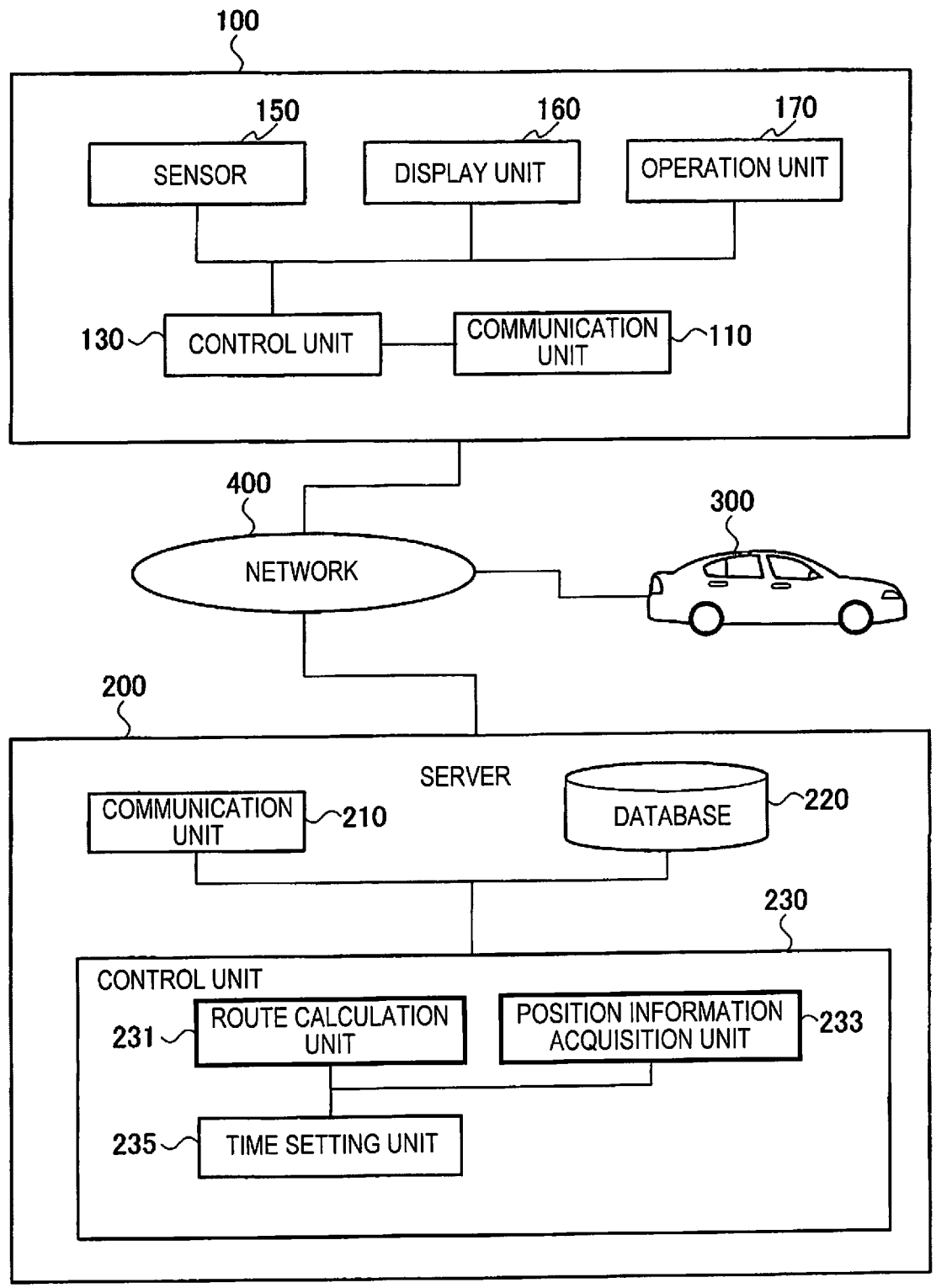
FIG. 1 is a block diagram showing a configuration of an information processing system according to one embodiment of the present invention.

FIG. 1 is a block diagram showing a configuration of an information processing system according to one embodiment of the present invention. The information processing system comprises a terminal 100 (information terminal), a server 200, and a vehicle 300, which are connected to each other over a wireless or wired network 400, as shown in FIG. 1.

Examples of the network 400 include the Internet. A mobile communication function such as 4G/LTE or 5G may also be used as the network 400.

The terminal 100 accepts an operation from a user and transmits information relating to the accepted operation to the wired network 400. Examples of the terminal 100 include portable terminals that are routinely used by the user (smartphone, tablet, etc.).

By operating the terminal 100, the user specifies a destination to which the vehicle 300 will head and an estimated arrival time at which the vehicle will arrive at the destination. The user can also specify an estimated departure time at which the vehicle 300 will depart by operating the terminal 100. Therefore, the information relating to the accepted operation can include the destination to which the vehicle 300 is heading, the estimated arrival time, the estimated departure time, etc.

The vehicle 300 is a ridden object that provides a means of movement to the destination specified by the user; examples of the vehicle include an autonomously driven vehicle. Other examples of the vehicle 300 include manned/unmanned taxis, buses, trucks, and various other movement means. A plurality of vehicles may be registered in the information processing system.

An onboard device (not shown) is installed in the vehicle 300, and vehicle information about the vehicle 300 (such as, for example, sensor information indicating a remaining battery life installed in the vehicle 300, or sensor information indicating the degree of need for maintenance of the vehicle 300, such as an extent of dirt on a surface of the vehicle 300 or degree of wear of various components of the vehicle 300) is transmitted from the vehicle 300 to the network 400.

The onboard device can also, similarly to the terminal 100, accept operations from the user and transmit information relating to accepted operations to the network 400. The onboard device can acquire the estimated departure time of the vehicle 300, and set a startup time for starting various equipment (air conditioning system, seat heater, etc.) installed in the vehicle 300 based on the acquired estimated departure time. The onboard device can automatically start up the equipment before the vehicle 300 departs or as the vehicle 300 departs.

The vehicle 300 can transmit vehicle information about the vehicle 300 at a prescribed timing or at prescribed periods, and can transmit vehicle information about the vehicle 300 based on a request from the terminal 100 or the server 200.

More specifically, the vehicle 300 can transmit vehicle information, and particularly information indicating the remaining battery life, at the timing at which charging of the installed battery starts or the timing at which charging ends. In addition, the vehicle 300 can transmit vehicle information at the timing at which an ignition is turned on or the timing at which the ignition is turned off.

The server 200 acquires information transmitted from the terminal 100 or the vehicle 300 via the network 400, and searches for a travel route for the vehicle 300 based on the acquired information. The current position of the vehicle 300, map information about the area surrounding the destination, and road information are used in searching for a travel route.

It is hereinafter assumed that the terminal 100, the server 200, and the vehicle 300 can communicate with each other in both directions via the network 400.

The terminal 100 (information terminal) shall next be described. As shown in FIG. 1, the terminal 100 according to the present embodiment is provided with sensors 150, a display unit 160, an operation unit 170, a communication unit 110, and a control unit 130 (controller).

The sensors 150 are formed from a plurality of sensor groups and include a position detection sensor that acquires position information about the terminal 100. For example, the position detection sensor is a global positioning system (GPS) or other type of sensor that measures absolute position.

The sensors 150 can also include environment sensors that acquire environment information (information such as temperature, humidity, vibration, acceleration rate, and sound) relating to the environment in which the terminal 100 is present. For example, the environment sensors may be temperature sensors, humidity sensors, vibration sensors, acceleration sensors, microphones, etc.

The display unit 160 displays information about the vehicle 300 and information related to the travel route for the vehicle 300 searched for by the server 200. The information about the vehicle 300 and the information relating to the travel route are acquired by the communication unit 110 (described later) from the server 200 via the network 400. The display unit 160 can also display information for a route from the position of the terminal 100 to the position of the vehicle 300, the route information being required for the user to move to the position of the vehicle 300, and guidance information for guiding movement of the user.

Presenting the various information in the form of visual information is not a limitation on the display unit 160. The display unit 160 can present information to the user in the form of auditory information, and can cause vibration to present information to the user in the form of vibratory stimulation.

Through visual information, auditory information, and vibratory stimulation, the display unit 160 can issue various notifications to the user. Examples of the content of the notification issued by the display unit 160 include, inter alia, whether or not there is a travel plan for the vehicle 300, a planned departure time for the vehicle 300 in the travel plan, the travel route on which the vehicle 300 is planned to travel, and traffic information and weather information on the travel route. The time at which the display unit 160 issues the notification can be set by the server 200 (described later).

The operation unit 170 accepts operations performed by the user that correspond to various commands from the user to the information processing system. For example, the operation unit 170 may be an input interface provided with a plurality of buttons, or may be a touch panel provided with a touch interface.

More specifically, the display unit 160 displays an icon represented by a picture or a symbol so as to enable operation of the icon by the user, and the operation unit 170 accepts an operation by the user performed by the user touching, dragging, or otherwise manipulating the displayed icon.

The communication unit 110 transmits information to, and receives information from, the network 400. The communication unit 110 stores the information acquired from the network 400 in a memory, etc. (not shown), and outputs prescribed information, such as a request or environment information generated based on the operation performed by the user, to the network 400. For example, the communication unit 110 may be an onboard device provided with a 4G/LTE mobile communication function, or may be an onboard device provided with a Wifi communication function.

The control unit 130 is connected to the sensors 150, the display unit 160, the operation unit 170, and the communication unit 110. Information from the sensors 150, the operation unit 170, and the communication unit 110 is inputted to the control unit 130, and information directed to the display unit 160 and the communication unit 110 is outputted from the control unit 130.

The control unit 130 is a general-purpose microcomputer provided with a central processing unit (CPU), a memory, and an input/output unit. A computer program (information terminal program) for the purpose of functioning as part of the information processing system is installed in the control unit 130. By executing the computer program, the control unit 130 controls the display unit 160 and the communication unit 110.

Various information processes provided to the control unit 130 may be executed by software or by dedicated hardware.

As the information process performed by the control unit 130, particularly, the control unit 130 generates a request for the information processing system based on the operation performed by the user on the operation unit 170. For example, the request can include a designation of a destination to which the vehicle 300 is heading or a planned arrival time at which the vehicle will arrive at the destination. The request can also include a designation of a planned departure time at which the vehicle 300 will depart.

User attribute information may also be included in the request. Information about the user's preferences, age, gender, occupational category, or physical characteristics, as well as the occurrence of an event before or after the request and the classification of such an event, may be included in the user attribute information.

For example, when the terminal 100 is a portable terminal that is routinely used by the user (smartphone, tablet, etc.), an application serving as the information terminal program can acquire these items of attribute information by coordinating with a social networking service (SNS), another cloud service, etc.

The onboard device (not shown) installed in the vehicle 300 can, similarly with the terminal 100, comprise sensors 150, a display unit 160, an operation unit 170, a communication unit 110, and a control unit 130 (controller).

The server 200 (information processing device) shall next be described. As shown in FIG. 1, the server 200 according to the present embodiment is provided with a communication unit 210 (communication means), a database 220, and a control unit 230 (controller).

The communication unit 210 transmits information to, and receives information from, the network 400. The communication unit 210 acquires, from the network 400, requests transmitted from the terminal 100 and prescribed information such as vehicle information transmitted from the vehicle 300, and records the acquired information in the database 220. The communication unit 210 can acquire traffic information and weather information from an external server other than the server 200.

The database 220 stores information acquired by the communication unit 210, such as vehicle information about the vehicle 300, the position of the terminal 100, and the position of the vehicle 300. The server 200 can also store past requests from the user, the history and frequency of the use of the information processing system, etc. The database 220 may also store a variety of parameter tables for estimating the user characteristics of the user.

The control unit 230 (controller, one example of a processing unit) is a general-purpose microcomputer provided with a central processing unit (CPU), a memory, and an input/output unit. A computer program (information processing server program) for the purpose of causing the control unit 230 to function as part of the information processing system is installed in the control unit 230. By executing the computer program, the control unit 230 functions as a plurality of information processing circuits (231, 233, 235).

An example is described here in which the plurality of information processing circuits (231, 233, 235) provided to the control unit 230 are executed by software. However, it is also possible to configure the information processing circuits (231, 233, 235) by preparing dedicated hardware for executing various information processing described below. The plurality of information processing circuits (231, 233, 235) may also be configured from individual hardware.

The control unit 230 comprises a route calculation unit 231, a position information acquisition unit 233, and a time setting unit 235 as the plurality of information processing circuits (231, 233, 235).

The position information acquisition unit 233 (position information acquisition means) acquires the position of the terminal 100 and the position of the vehicle 300 via the communication unit 210. In addition, information about the destination to which the vehicle 300 is heading is acquired based on a request transmitted from the terminal 100.

Based on the position of the vehicle 300 acquired by the position information acquisition unit 233 and the destination designated by the user, the route calculation unit 231 (route calculation means) searches for a travel route to the destination and sets a route as the travel route to be used for the traveling of the vehicle 300.

The route calculation unit 231 calculates waypoints that must be passed through based on the vehicle information about the vehicle 300, and calculates a travel route leading through the waypoints to the destination. For example, when, within the vehicle information, the remaining life of the battery installed in the vehicle 300 is equal to or less than a prescribed threshold value, a charging spot is selected as a waypoint. When, within the vehicle information, there is a high degree of need for maintenance of the vehicle 300, a maintenance facility where cleaning of the vehicle 300 or replacement/repair of various components of the vehicle 300 is possible is selected as a waypoint. The route calculation unit 231 calculates a travel route leading through these waypoints to the destination.

In addition, the route calculation unit 231 can refer to the database 220 when searching for a travel route, and the route calculation unit 231 can search for a travel route based on map information, road information, traffic information, weather information, and also information such as the planned departure time at which the vehicle 300 and the planned arrival time at which the vehicle will arrive at the destination.

The travel route set by the route calculation unit 231 is outputted outside of the server 200, and serves other purposes such as, for example, being displayed on the terminal 100 and being used for the traveling of the vehicle 300.

The route calculation unit 231 sets a temporary route (first travel route) as the travel route immediately after the communication unit 210 has acquired the request from the user, and then sets a main route (second travel route) as the travel route at the time the main route is calculated (described later).

The time setting unit 235 (time setting means) sets a main route calculation time at which the route calculation unit 231 will start the process of setting the main route. More specifically, a time just before a first prescribed time from the time when the vehicle 300 will start traveling on the temporary route is set as a main route calculation time. The first prescribed time can be said to be a time between the time at which the vehicle information for the vehicle 300 is acquired and the time at which the vehicle 300 will start traveling on the temporary route. The user can be given the ability to set the first prescribed time, which is a parameter.

A temporary route calculation time, which is the time at which the route calculation unit 231 will start the process of setting the temporary route (a time immediately after the communication unit 210 acquires the request from the user, is differentiated from the main route calculation time.

The time setting unit 235 can set a time (reminder time) at which the terminal 100 will issue a notification to the user. More specifically, the time setting unit 235 sets a reminder time based on the position of the terminal 100 and the position of the vehicle 300 acquired by the position information acquisition unit 233, and the time (first time) at which the vehicle 300 will start traveling on the travel route.

For example, the time setting unit 235 can set a reference reminder time based on the time (first time) at which the vehicle 300 will start traveling on the travel route. The reference reminder time can be the time at which the vehicle 300 will start traveling on the travel route, and a time calculated by subtracting a second prescribed time from the time at which the vehicle 300 will start traveling on the travel route can be set as the reminder time. The user can be given the ability to set the second prescribed time, which is a parameter.

The time setting unit 235 can calculate a travel time for the user to move from the position of the terminal 100 to the position of the vehicle 300, and can set a time calculated by subtracting the travel time from the reference reminder time as a correction reminder time (second time).

The travel time for the user can be calculated by calculating a movement distance from the position of the terminal 100 to the position of the vehicle 300 based on map information and road information, and dividing the movement distance by a prescribed velocity. The prescribed velocity is a velocity at which the movement means (walking, automobile, bicycle, etc.) used by the user moves.

In addition, information about the weather at the position of the terminal 100 or information about the weather at the position of the vehicle 300 can be acquired, and the time during which the user moves can be calculated based on the weather information. Specifically, the travel time can be calculated such that the travel time in a case of bad weather (rain, snow, storm, etc.) is longer than the travel time in a case of good weather (sunny, cloudy, etc.).

The time setting unit 235 can set the reminder time based on the time at which the vehicle 300 will start traveling on the temporary travel route, or can set the reminder time based on the time at which the vehicle 300 will start traveling on the main travel route.

Figure 2:
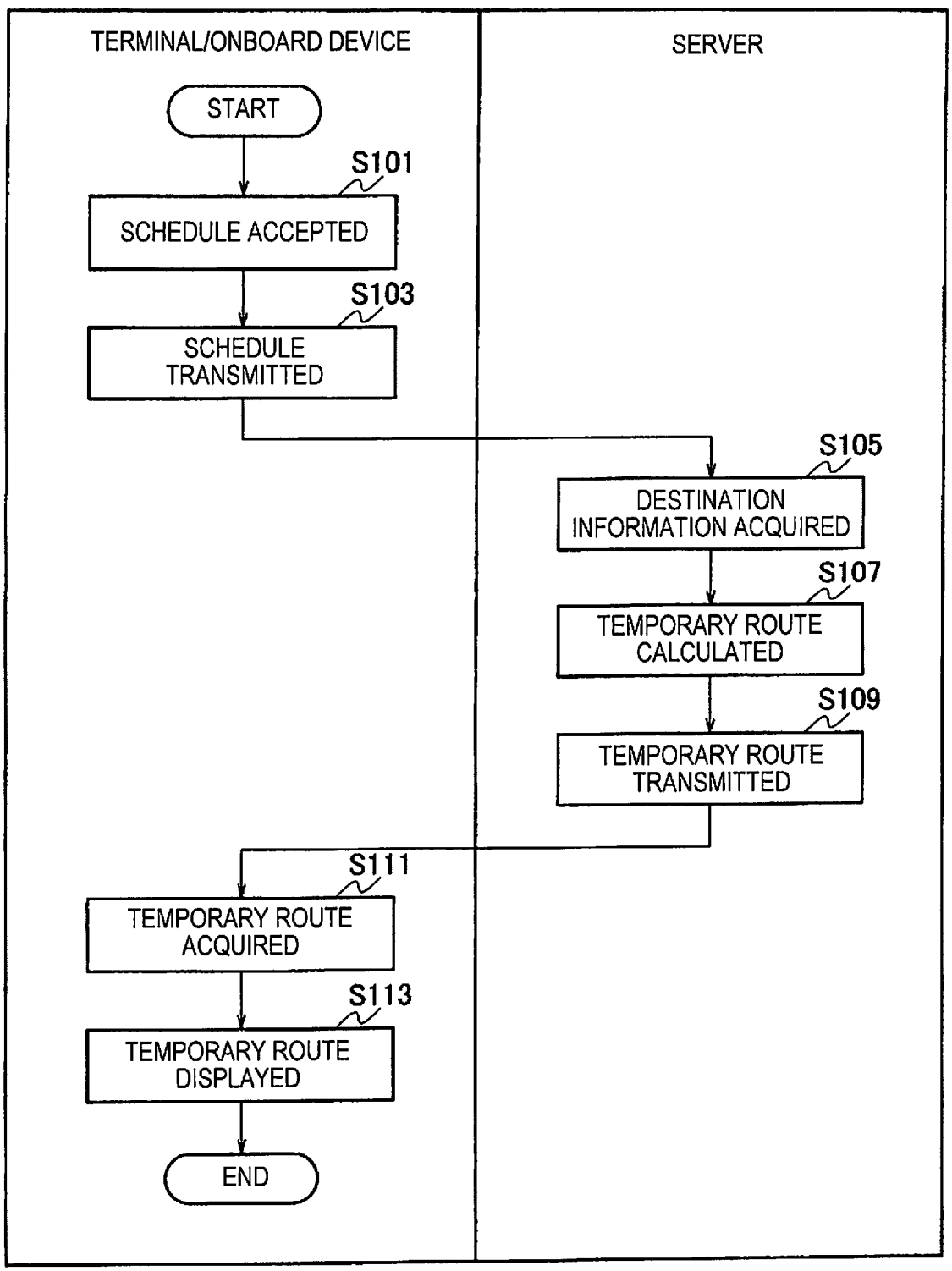
FIG. 2 is a flowchart showing a process procedure leading up to a temporary route display in the information processing system according to one embodiment of the present invention.
Figure 3:
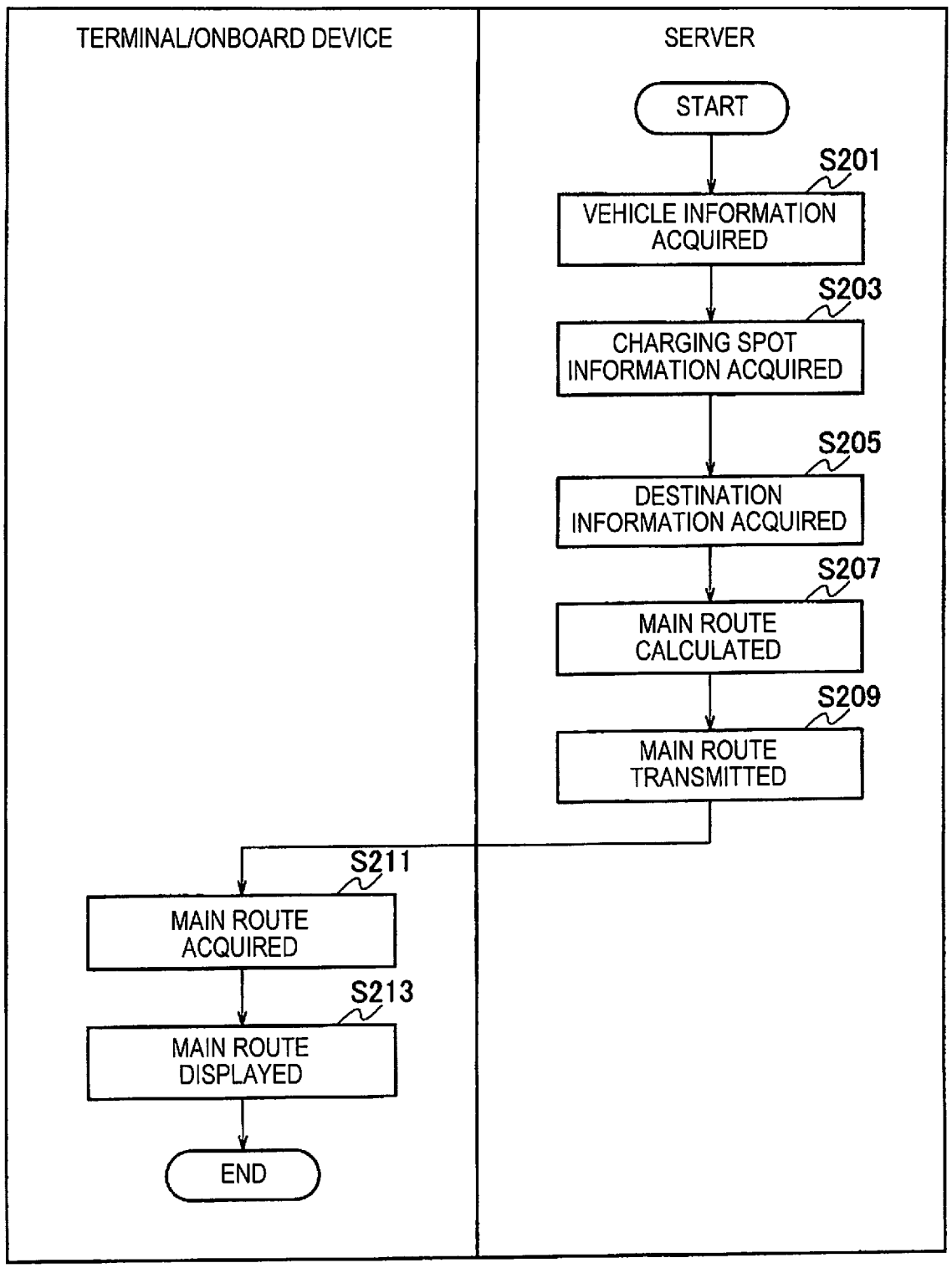
FIG. 3 is a flowchart showing a process procedure leading up to a main route display in the information processing system according to one embodiment of the present invention.

A process procedure of the information processing system according to the present embodiment shall next be described with reference to the flowcharts of FIGS. 2 and 3. FIG. 2 is a flowchart showing a process procedure leading up to a temporary route display in the information processing system according to one embodiment of the present invention. FIG. 3 is a flowchart showing a process procedure leading up to a main route display and a reminder execution in the information processing system according to one embodiment of the present invention.

The process of the flowchart shown in FIG. 2 is begun when the terminal 100 or an onboard device of the vehicle 300 starts up.

In step S101, the terminal 100 or the onboard device in the vehicle 300 accepts a schedule from the user. Specifically, the terminal or the onboard device accepts from the user a request including the destination to which the vehicle 300 is heading and a planned arrival time.

In step S103, the terminal 100 or the onboard device of the vehicle 300 transmits the accepted schedule (request).

In step S105, based on the accepted request, the server 200 acquires information about the destination to which the vehicle 300 is heading.

In step S107, the server 200 calculates a temporary route (first travel route) and sets the temporary route as the travel route of the vehicle 300.

In step S109, the server 200 transmits the calculated temporary route.

In step S111, the terminal 100 or the onboard device of the vehicle 300 to which the request was transmitted acquires the temporary route from the server 200.

In step S113, the terminal 100 or the onboard device of the vehicle 300 to which the request was transmitted displays the acquired temporary route.

Next, the process of the flowchart shown in FIG. 3 is begun at the main route calculation time.

In step S201, the server 200 acquires vehicle information about the vehicle 300.

In step S203, based on the vehicle information about the vehicle 300, the server 200 selects a charging spot that the vehicle 300 must pass through en route to the destination, and sets the selected charging spot as a waypoint.

In step S205, the server 200 acquires information about the destination which is recorded in the database 220 and to which the vehicle 300 is heading.

In step S207, the server 200 calculates a main route (second travel route) and sets the main route as the travel route of the vehicle 300.

In step S209, the server 200 transmits the calculated main route.

In step S211, the terminal 100 or the onboard device of the vehicle 300 to which the request was transmitted acquires the main route from the server 200.

In step S213, the terminal 100 or the onboard device of the vehicle 300 to which the request was transmitted displays the acquired main route.

As described in detail above, in the information processing method, information processing system, information processing device, and information terminal according to the present embodiment, a destination for a vehicle is accepted from a user, a travel route to the destination is searched for and set as a first travel route, and after the first travel route has been set and before the vehicle starts traveling on the first travel route, a travel route to the destination is again searched for and set as a second travel route based on acquired vehicle information about the vehicle.

Due to this feature, a travel route reflecting the most recent status of the vehicle can be obtained again even if the status changes after the travel route has been calculated, and the vehicle can start traveling based on a travel route reflecting the most recent status. As a result, convenience is improved for the user who is using the vehicle.

In addition, in the information processing method, information processing system, information processing device, and information terminal according to the present embodiment, the vehicle information may include information indicating the remaining level in a battery installed in the vehicle. It is thereby possible to more accurately determine whether or not to include a charging spot in a waypoint based on the most recent status of the vehicle and to appropriately set the travel route, even when the remaining level in the battery changes due to, inter alia, the vehicle traveling by means of battery power or the battery being charged after the first travel route has been set. As a result, convenience is improved for the user who is using the vehicle. Furthermore, the user will not need to pay attention to the remaining level of the battery in the vehicle while traveling, or to perform tasks such as reconfirming the travel route set before traveling.

Furthermore, in the information processing method, information processing system, information processing device, and information terminal according to the present embodiment, the user may be allowed to set the time between the time at which the vehicle information is acquired and the time at which the vehicle starts traveling on the first travel route. In other words, the user is allowed to adjust the timing at which a travel route is searched for again and a second travel route is set, and the user can therefore determine at what timing before the vehicle starts traveling the status of the vehicle will be reflected in the second travel route. As a result, a more practical travel route setting is made possible, which conforms to the user's preferences and to the manner in which the user uses the vehicle.

In addition, in the information processing method, information processing system, information processing device, and information terminal according to the present embodiment, startup times for starting equipment installed in the vehicle may be set in accordance with the time at which the vehicle starts traveling on the second travel route. Due to this feature, the environment inside the vehicle can be adjusted by the equipment installed the vehicle such as an air conditioning system and a seat heater, and the user can be more comfortable in the vehicle.

Furthermore, in the information processing method, information processing system, information processing device, and information terminal according to the present embodiment, a second travel route may be outputted. It is thereby possible to start vehicle travel based on a travel route that reflects the most recent status. As a result, convenience is improved for the user who is using the vehicle.

The functions shown in the embodiments above can be implemented by one or more processing circuits. The term 'processing circuit' includes a programmed processor, an electrical circuit, or the like, and furthermore includes a device such as an application-specific integrated circuit (ASIC), circuit-configured elements arranged so as to execute described functions, and other configurations.

The particulars of the present invention were described above according to an embodiment, but such disclosures are not provided by way of limitation to the present invention; it would be obvious to a person skilled in the art that various modifications and improvements can be made. The discussion and drawings constituting a part of this disclosure should not be understood as limiting the invention. From this disclosure, various alternative embodiments, examples, and operation techniques will be apparent to a person skilled in the art.

As shall be apparent, the present invention includes various embodiments, etc., that are not described above. Therefore, the technical scope of the present invention is defined only by the subject matter according to the claims reasonably derived from the foregoing descriptions.

The invention claimed is:

1. An information processing method that uses a server and a terminal having a processor and a display device to set a travel route to a destination for a vehicle, the information processing method comprising:
    accepting the destination for the vehicle;
    conducting a first search to obtain a first travel route to the destination;
    controlling the display device to display the first travel route;
    setting a travel start time to start traveling on the first travel route;
    acquiring vehicle information for the vehicle after conducting the first search to obtain the first travel route;
    at a time after acquiring the vehicle information and prior to the travel start time by a prescribed amount of time, conducting a second search based on the vehicle information to obtain a second travel route to the destination, the second search including calculating a waypoint that must be passed through based on the vehicle information;
    controlling the display device to display the second travel route;
    setting a startup time for starting equipment installed in the vehicle in accordance with a travel start time at which the vehicle starts traveling on the second travel route; and
    starting the equipment at the startup time,
    the first search being conducted without using the vehicle information to obtain the first travel route and without calculating the waypoint,
    the first travel route being set as a temporary travel route,
    the second travel route being set as a main route, and
    the method enabling a user to set the prescribed amount of time.

2. The information processing method according to claim 1, wherein
    the vehicle information includes information indicating a remaining level of a battery installed in the vehicle.

3. The information processing method according to claim 1, wherein
    the vehicle information includes information indicating remaining battery life and the waypoint is a charging spot.

4. An information processing system configured to set a travel route to a destination for a vehicle, the information processing system comprising:
    a terminal having a processor and a display device;
    a server;
    a vehicle including an onboard device; and
    a network,
    the terminal being configured to accept the destination for the vehicle from a user and transmit the destination to the server,
    the server being configured to
        conduct a first search to obtain a first travel route to the destination and transmit the first travel route to the terminal,
        set a travel start time to start traveling on the first travel route,
        acquire vehicle information for the vehicle after the first travel route has been obtained and transmitted,
        at a time after acquiring the vehicle information and prior to the travel start time by a prescribed amount of time, conduct a second search based on the vehicle information to obtain a second travel route to the destination and transmit the second travel route to the terminal, the second search including calculating a waypoint that must be passed through based on the vehicle information, and
        set a startup time for starting equipment installed in the vehicle in accordance with a travel start time at which the vehicle starts traveling on the second travel route; and
    the onboard device being configured to start the equipment at the startup time,
    the terminal being further configured to control the display device to display the first travel route upon receiving the first travel route from the server and display the second travel route upon receiving the second travel route from the server,
    the server being configured to conduct the first search without using the vehicle information to obtain the first travel route and without calculating the waypoint,
    the first travel route being set as a temporary travel route, and
    the second travel route being set as a main route
    the information processing system being configured to enable a user to set the prescribed amount of time.

5. The information processing system according to claim 4, wherein
    the vehicle information includes information indicating remaining battery life and the waypoint is a charging spot.

6. An information processing device comprising:
    a server that includes a processor and a database,
    the server being configured to
        accept a request for a destination for a vehicle from a terminal via a network,
        acquire the destination for the vehicle included in the request,
        conduct a first search to obtain a first travel route to the destination,
        transmit the first travel route to the terminal such that the terminal displays the first travel route,
        set a travel start time to start traveling on the first travel route;

acquire vehicle information for the vehicle after the first travel route has been obtained and transmitted; and at a time after acquiring the vehicle information and prior to the travel start time by a prescribed amount of time, conduct a second search based on the vehicle information to obtain a second travel route to the destination, the second search including calculating a waypoint that must be passed through based on the vehicle information, transmit the second travel route to the terminal such that the terminal displays the second travel route, set a startup time for starting equipment installed in the vehicle in accordance with a travel start time at which the vehicle starts traveling on the second travel route, and transmit the startup time to an onboard device of the vehicle so that the onboard device causes the equipment to start at the startup time, the server being configured to conduct the first search without using the vehicle information to obtain the first travel route and without calculating the waypoint, the first travel route being set as a temporary travel route, and the second travel route being set as a main route the information processing device being configured to enable a user to set the prescribed amount of time.

7. The information processing device according to claim 6, wherein the vehicle information includes information indicating remaining battery life and the waypoint is a charging spot.

8. An information terminal comprising:

a processor;

a display device; and a user interface configured to receive input from a user, the information terminal being configured to accept a destination for the vehicle inputted by a user, generate a request based on the destination and transmit the request to a server; and cooperate with the server, which is configured to acquire the destination for the vehicle included in the request;

conduct a first search to obtain a first travel route to the destination and transmit the first travel route to the information terminal;

set a travel start time to start traveling on the first travel route; and acquire vehicle information for the vehicle after obtaining and transmitting the first travel route;

at a time after acquiring the vehicle information and prior to the travel start time by a prescribed amount of time, conduct a second search based on the vehicle information to obtain a second travel route to the destination and transmit the second travel route to the information terminal, the second search including calculating a waypoint that must be passed through based on the vehicle information;

set a startup time for starting equipment installed in the vehicle in accordance with a travel start time at which the vehicle starts traveling on the second travel route; and transmit the startup time to an onboard device of the vehicle so that the onboard device causes the equipment to start at the startup time, the information terminal being further configured to control the display device to display the first travel route upon receiving the first travel route from the server and display the second travel route upon receiving the second travel route from the server, the server being configured to conduct the first search without using the vehicle information to obtain the first travel route and without calculating the waypoint, the first travel route being set as a temporary travel route, and the second travel route being set as a main route, the information terminal being configured to enable a user to set the prescribed amount of time.

9. The information terminal according to claim 8, wherein the vehicle information includes information indicating remaining battery life and the waypoint is a charging spot.

* * * * *